United States Patent [19]

Evans

[11] Patent Number: 4,523,378

[45] Date of Patent: Jun. 18, 1985

[54] METHOD AND APPARATUS FOR ASSEMBLING ELECTRICAL CONTACT ELEMENTS IN AN ELECTRICALLY INSULATIVE BODY

[75] Inventor: Thomas E. Evans, Rehoboth, Mass.

[73] Assignee: Texas Instruments Incorporated, Dallas, Tex.

[21] Appl. No.: 475,778

[22] Filed: Mar. 16, 1983

[51] Int. Cl.[3] ........................ H01R 43/04; B23P 23/00

[52] U.S. Cl. .................................... 29/881; 29/564.6; 29/759

[58] Field of Search ...................... 29/881, 876, 564.1, 29/564.3., 564.6, 759; 228/4.5

[56] References Cited

U.S. PATENT DOCUMENTS 4,258,469 3/1981 Salvesen ........................ 29/564.6 X

*Primary Examiner*—Howard N. Goldberg
*Assistant Examiner*—Carl J. Arbes
*Attorney, Agent, or Firm*—John A. Haug; James P. McAndrews; Melvin Sharp

[57] ABSTRACT

Electrical sockets used for mounting integrated circuits and the like are assembled by sequentially feeding electrically insulative bodies onto a track between a pair of endless belts which transmit motion to the bodies forcing them to move along a first path which extends beyond the belts. The socket bodies typically are provided with two parallel rows of contact receiving apertures which extend through the bodies from the top surface to the bottom surface thereof. A continuous carrier strip having spaced contact elements depending therefrom is directed along a second path which tangentially meets the first path so that the contact elements are sequentially received in one of the two rows of contact receiving apertures. The contact elements are securely seated by means of a seating roller and are then staked in position by one or more staking rollers after which the contact elements are severed from the carrier strip. Another carrier strip having similar spaced contact elements depending therefrom is directed along a third path which tangentially meets the first path so that the contact elements are sequentially received in the other of the two rows of contact receiving apertures. The contact elements of the other row are then in turn seated, staked and severed from the carrier strip in the same manner as in the one row. The assembled sockets are then placed in suitable storing or shipping containers for ultimate use.

21 Claims, 21 Drawing Figures

Fig.18.
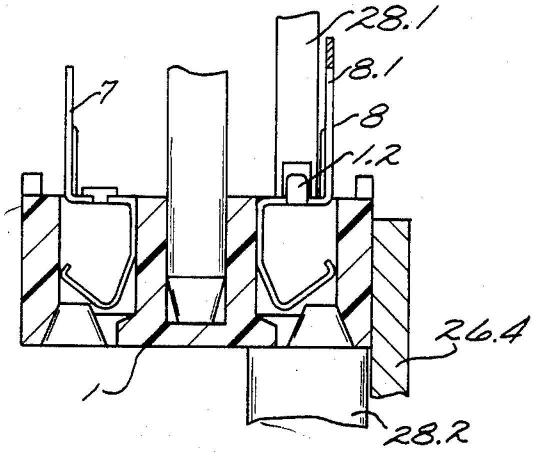
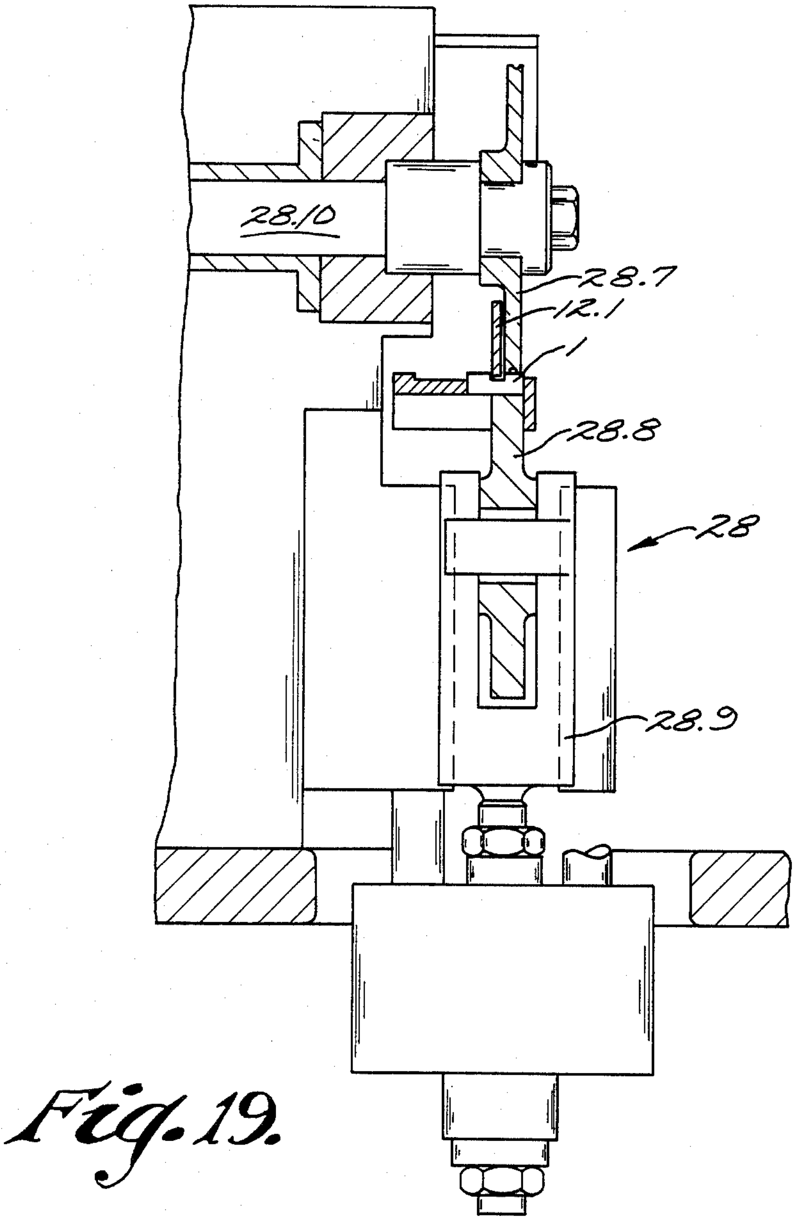
Fig.19.

METHOD AND APPARATUS FOR ASSEMBLING ELECTRICAL CONTACT ELEMENTS IN AN ELECTRICALLY INSULATIVE BODY

BACKGROUND OF THE INVENTION

This invention relates generally to electrical sockets for mounting integrated circuits and the like and more particularly to a method and apparatus for assembling such sockets.

Such sockets generally comprise a body of electrically insulative material having a plurality of contact receiving apertures extending from a top surface down to a bottom surface of the body. A common type of socket has a pair of rows of contact receiving apertures. Depending upon the application for which the socket is to be used, a variety of contact configurations have become common with regard to the spacing between the rows as well as the total number of contacts in a row. One of the most common is a sixteen position or contact socket having two rows of eight contacts with the socket being slightly less than an inch in length. On the other hand, sockets could have many more contact positions and be several inches long. Although there are many socket variations, it is an accepted industry standard to space the contacts in a row the same distance from one another.

DESCRIPTION OF THE PRIOR ART

A conventional way of assembling such sockets involves the use of a machine having a turntable with dial indexing of a number of fixture stations. The machine is adapted to accommodate at each position as many socket bodies, one behind another, as will total a selected total length, for example three inches. In such a machine one could load three sixteen position bodies of the type described above since each is slightly less than one inch in length, or alternatively only one body if it is over an inch and a half in length. Sections of contact elements, attached to a selvedge or carrier web are fed into an appropriate holder, lined up with the bodies and inserted into one row of apertures. Sections of contacts are fed into another holder for insertion into the other row of apertures. The contacts of each row are severed from the carrier strip, the sockets are coded and ejected from the machine. For each of the above operations the turntable is indexed around from one work station to another. By way of example, one such machine has a total of eight work stations. Using this type of apparatus to assemble sockets involves several undesirable, inherent limitations regarding efficiency, reliability and speed of assembly. For example, for each type of socket the set up must be varied. A change in the width of the body requires a change in alignment for feeding of at least one of the contact sections. A change in the length of the sockets, e.g. two thirty position sockets rather than three eighteen position sockets, requires a different length of contact carrier section. Once the apparatus is set up there is still significant lost time, including the time for indexing the stations which consume in the order of a third to a half of one complete cycle. That is, there is a finite period of time required for tooling, to approach and move away from a work station.

SUMMARY OF THE INVENTION

It is an object of the invention to provide an improved method and apparatus for assembling contacts into a body, one which is faster than prior art approaches yet is economical and reliable. Another object is the provision of a method and apparatus for assembling electrical sockets which can be used with different socket body widths and lengths without requiring set up times when changing from one body size to another. Yet another object is the provision of apparatus for assembling sockets which is independent of the number of contact positions in a body as well as the width of the body. Other objects and features will be in part apparent and in part pointed out herein after.

Briefly, in accordance with the invention, an electrically insulative body having a pair of rows of contact receiving apertures extending along the length of the body are placed sequentially onto a track along a first path between opposed, endless belts which are firmly biased against opposed sides of the body. The belts impart motion to the bodies moving them through direct frictional engagement along a selected length of the first path after which the bodies are moved by the pushing force of upstream bodies. One side of the body is referenced by camming the body over to one side of the track and a continuous carrier strip having spaced contact elements depending therefrom is directed along a second path which tangentially meets the first path with the contact elements sequentially being received in the contact receiving apertures of the row closest to the referenced side of the body. Once received in the bodies, the contact elements, through the carrier strip, transfer motion from the bodies to the carrier strip, in effect pulling the carrier strip from a reel as required. Complete seating of the contacts is ensured by engaging a seating surface with the contact elements as the body moves past the surface. The contact elements are then staked to the body by deforming selected portions of the body with a deforming surface onto the contact elements as the body moves past the deforming surface. The body, still moved by the pushing force of upstream bodies, passes by a severing station at which a pair of counter-rotating wheels mounted on axes which lie in a plane perpendicular to the longitudinal axis of the first path at the severing station sever the contact elements from the carrier strip. The plane in which the wheels rotate is preferably inclined relative to plane in which the contact elements move.

The bodies, now free of the carrier strip and still being pushed by upstream bodies, are referenced so that the other side of the bodies are moved to the other side of the track by a camming surface. Another continuous carrier strip having spaced contact elements depending therefrom is directed along a third path which tangentially meets the first path with the contact elements sequentially being received in the contact receiving apertures of the row closest to the newly referenced side of the body (the other row). As in the case of the first row, the contact elements of the other row are then in turn seated, staked and severed from the carrier strip. The assembled sockets are then placed in suitable storing or shipping means for future handling.

BRIEF DESCRIPTION OF THE DRAWINGS

The above summary will become more clear from a detailed description in connection with the accompanying drawings wherein:

FIG. 18 is a view similar to FIG. 14 showing a contact element in the other row being engaged by the seating roller.

FIG. 19 is a view similar to FIG. 15 showing an end view of a staking roller.

Figure 2:
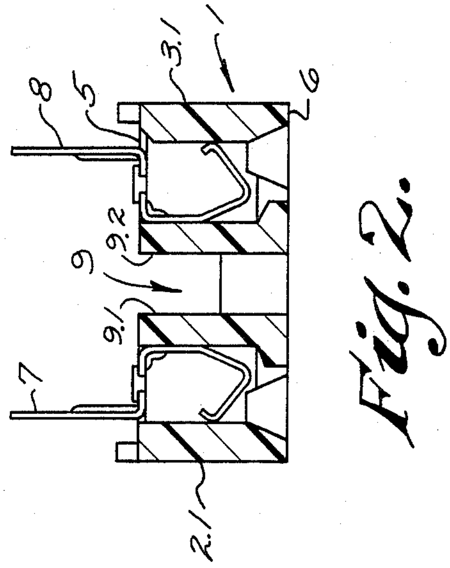
FIG. 2 is a cross section of the socket body of FIG. 1 showing a contact receiving aperture in each of two rows with a contact element received in each aperture.

Dimensions of certain parts as shown in the drawings may have been modified or exaggerated for the purpose of illustration.

DESCRIPTION OF THE PREFERRED EMBODIMENT

Figure 1:
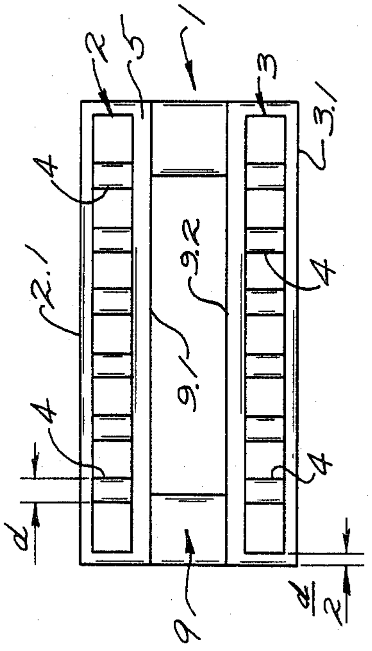
FIG. 1 is a plan view of a suitable electrical socket body into which electrical contacts can be assembled in accordance with the invention.

Referring now to the drawings, a typical socket body into which contact elements are to be assembled in accordance with the invention is shown in FIG. 1, indicated by the numeral 1, comprising first and second parallely extending rows 2 and 3 of contact receiving apertures 4 extending from the top surface 5 to the bottom surface 6. FIG. 2 shows contact elements 7 and 8 received in respective contact receiving apertures after they have been assembled into the socket body. Further details of a suitable integrated socket, which is amenable to being assembled in accordance with the invention is described and claimed in copending and coassigned U.S. application Ser. No. 300,077 filed Sept. 8, 1981, which issued on Oct. 18, 1983 as U.S. Pat. No. 4,410,231 however it will be realized that the invention is useful in assembling many types of elements receivable in element receiving apertures of a body.

Figure 3:
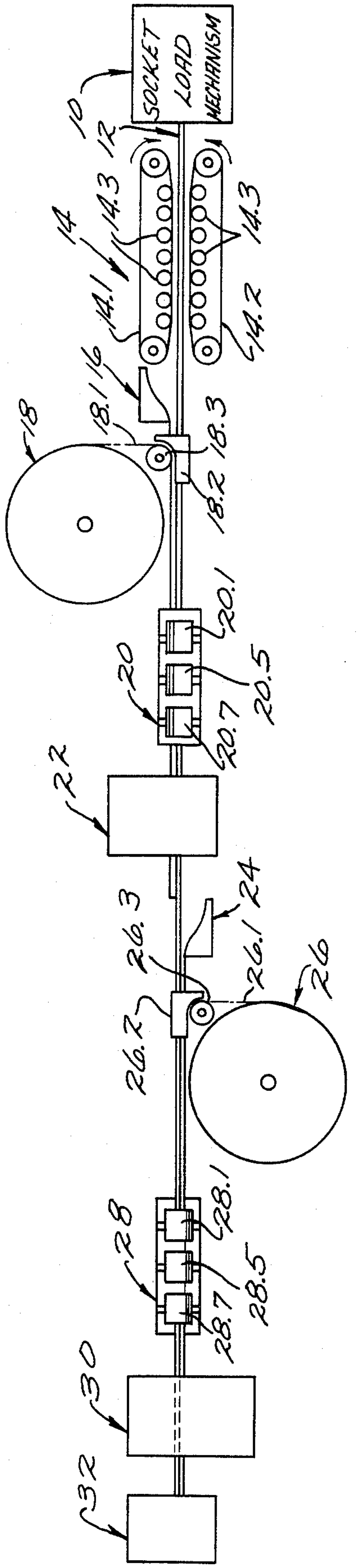
FIG. 3 is a schematic diagram showing apparatus for assembling contact elements into socket bodies in accordance with the invention.
Figure 4:
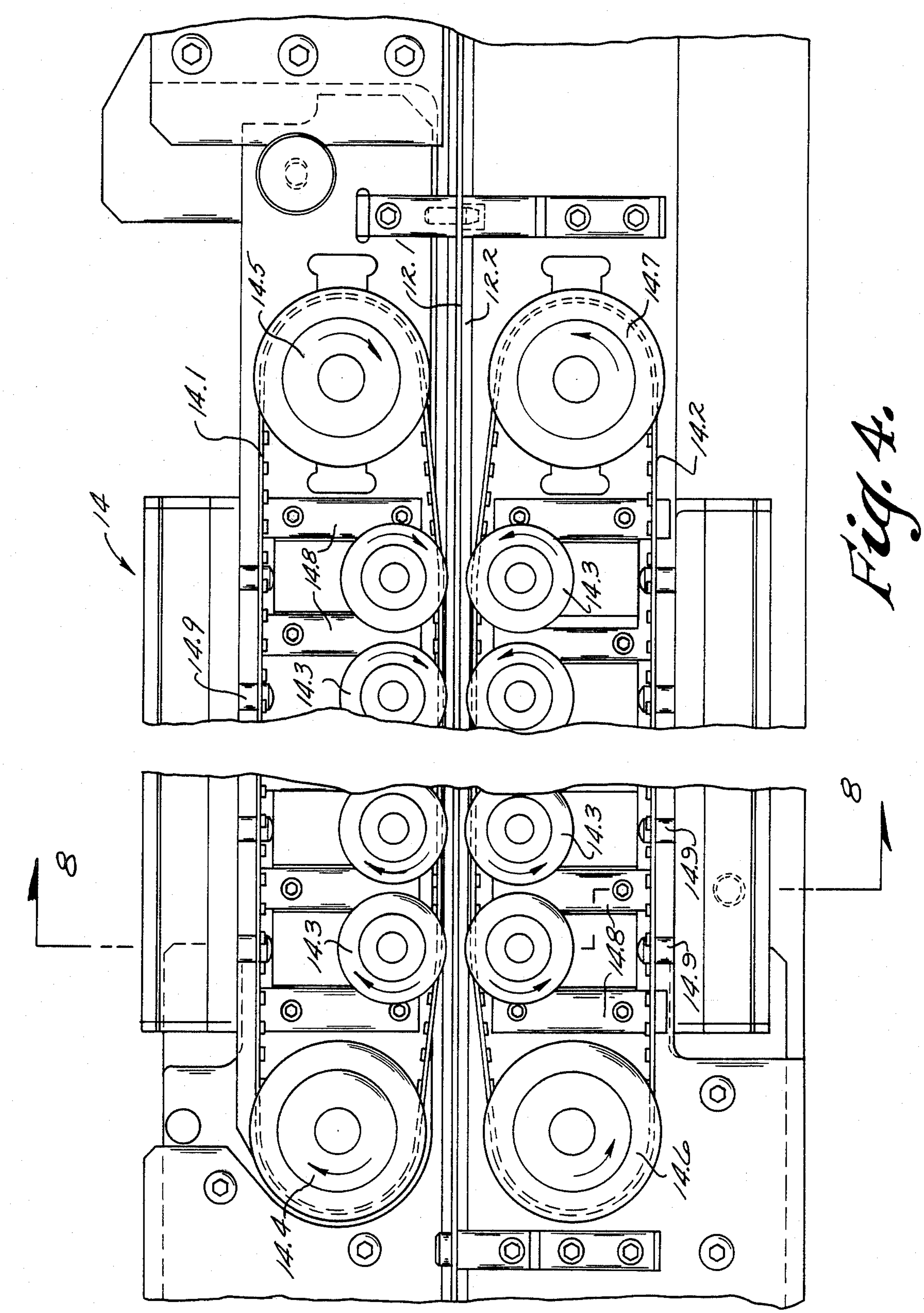
FIG. 4 is an enlarged top plan view, partly broken away, of the socket feeding means.

FIG. 3 schematically depicts the several stations and paths involved in practicing the invention starting with any suitable socket loading mechanism 10 adapted to place a supply of socket bodies 1, one body after another, lengthwise onto a track 12 and into a drive station 14. Drive station 14 comprises opposed endless belts 14.1 and 14.2 disposed on opposite sides of track 12 and adapted to frictionally engage opposed sides of the bodies and move them along a first path through the several stations of the apparatus. A series of idler rolls 14.3 are movably mounted within the area circumscribed by each belt 14.1 and are biased against the belt to impart a selected, force to the bodies disposed therebetween. Since drive station 14, as will be further described below, is the only drive provided for moving the bodies and the contact elements through the apparatus, it is desirable to firmly engage the bodies through the movable walls of belts 14.1 and 14.2. Thus by using a plurality of loaded idler rolls, a large total force can be imparted while avoiding over-concentrating the force on a short section of connector bodies with concomitant chances of crushing the socket bodies. As depicted in FIG. 3, a series of eight idler rollers for each drive belt 14.1, 14.2 has been found to be suitable with a load of approximately ten pounds placed on each roller.

After exiting the drive station 14 the bodies are referenced to one side of the track by a cam 16 so that one of the rows 2 and 3 is a predetermined distance from that side of the track. With reference again to FIG. 1 it should be pointed out that the distance that row 2 of apertures 4 from side 2.1 of body 1 is identical to the distance that row 3 of apertures 4 from side 3.1 and that the spacing between adjacent apertures in a row is uniform and equal to "d" while the spacing between the first and last aperture in a row to the closest end of the body is one half "d".

After the bodies are cammed to one side of the track 12, a continous carrier strip having elongated contact elements depending therefrom is directed from a suitable supply, such as a large reel 18, along a suitable second path 18.1 into a guide rail means 18.2 with the first and second paths adapted to converge and meet one another tangentially with the contact elements received sequentially in the contact receiving aperture of the row closest to the referenced side of the body, e.g. row 2 shown in FIG. 1. As will be described in further detail infra, at least one of the first and second paths is formed with a curved portion to accommodate reception of the contact elements into the contact element receiving apertures.

Motion from the bodies is transferred to the carrier web through the contact elements once they are received in their respective apertures so that the carrier strip is pulled out of the reel as needed, assuring proper alignment of the contact elements, which are spaced a distance "d" from one another on the carrier, with respective contact element, receiving apertures. After the contact elements are received in their respective apertures, the bodies are passed through a seating and staking station 20. The contact elements are engaged by a seating surface in the form of a roll, however other surfaces could be employed if so desired, in order to insure that the elements are fully seated in their apertures. This is followed by deforming a selected portion of the body onto the seated contact element to securely maintain the contact elements in their seats. As shown in the figures, two staking rollers are employed for this purpose to incrementally deform a protrusion onto a transversely extending portion of the contact element however it will be realized that other deforming means could be used such as an ultrasonic head or a heated rail surface.

Following the seating and staking station the bodies are received at severing station 22 where the contact elements are severed from the carrier strip.

The bodies, freed from the carrier strip but still driven by upstream bodies, are referenced to the other side of the track by cam 24 so that side 3.1 of body 1 and hence row 3 is at the same predetermined distance from that side of the track as was row 2 when it received its contact elements as described above.

A second continous carrier strip with depending contact elements is supplied from a suitable reel 26 and directed along a third path into a guide rail means 26.2 with the first and third paths adapted to converge and meet one another tangentially with the contacts received sequentially in the contact receiving apertures of the row closest to the referenced side of the body, e.g. row 3 shown in FIG. 1. As in the case of the first and second paths, at least one of the first and third paths is formed with a curved portion to accommodate reception of the contact elements into the contact element receiving apertures.

It should be noted that in inserting the contact elements in row 2 body side 2.1 is used as a reference surface while side 3.1 is used as a reference surface for inserting the contact elements in row 3 independently of the particular distance between the two rows. Thus any body width, within a minimum and maximum design limit, can be accommodated in practicing the invention without making any adjustments to the apparatus.

After the contact elements are received in their respective apertures, the bodies are passed through a sealing and staking station 28 similar to station 20 for row 2 of apertures, and then are passed through severing station 30 where the contact elements of row 3 are severed from the carrier strip thereby completing the assembly of the electrical socket. The sockets are finally received in a suitable storage or shipping means 32 for eventual use.

Figure 5:
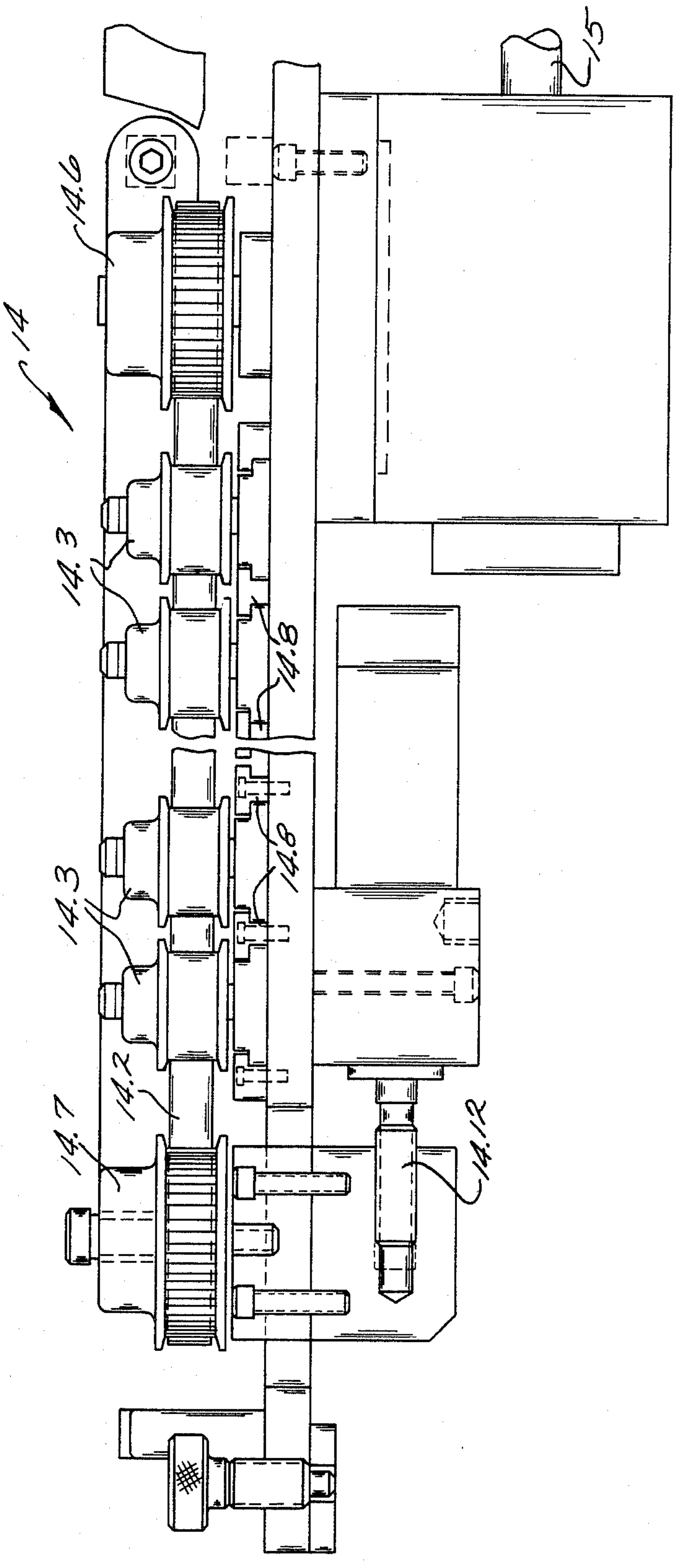
FIG. 5 is a front elevational view of the FIG. 4 feeding means.
Figure 6:
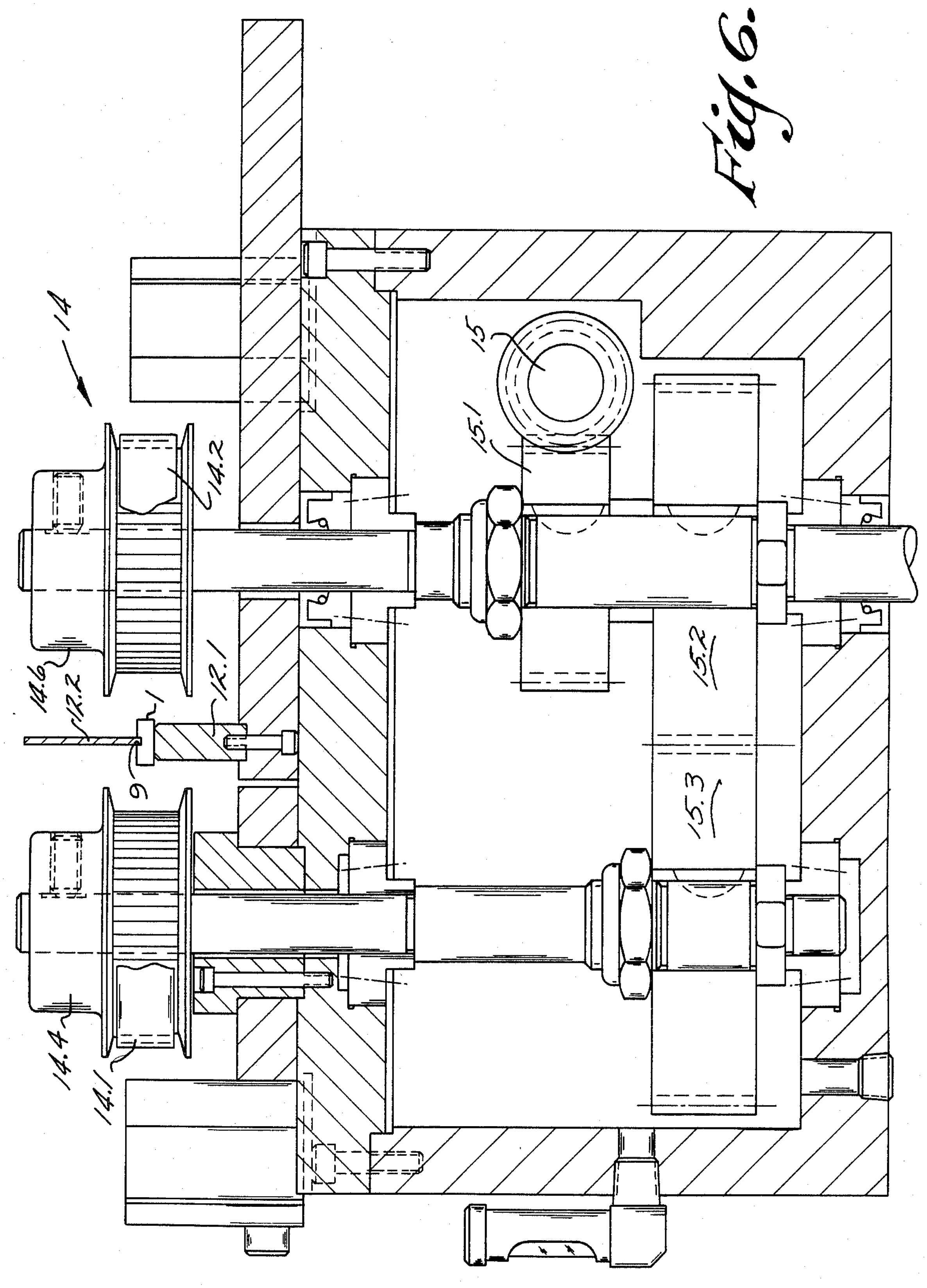
FIG. 6 is an end view of the FIGS. 4, 5 feeding means.
Figure 7:
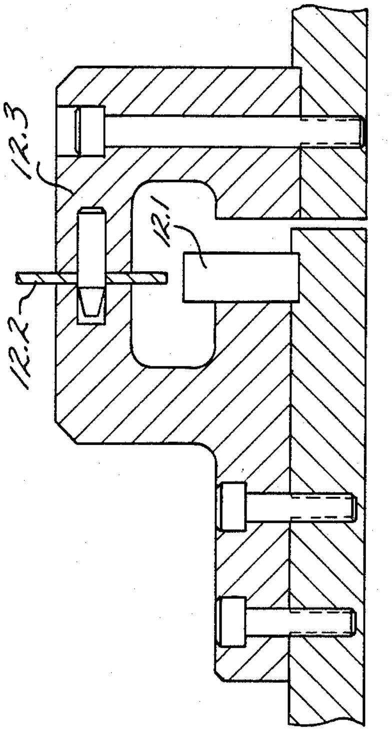
FIG. 7 is a partial end view of a guide rail support.
Figure 8:
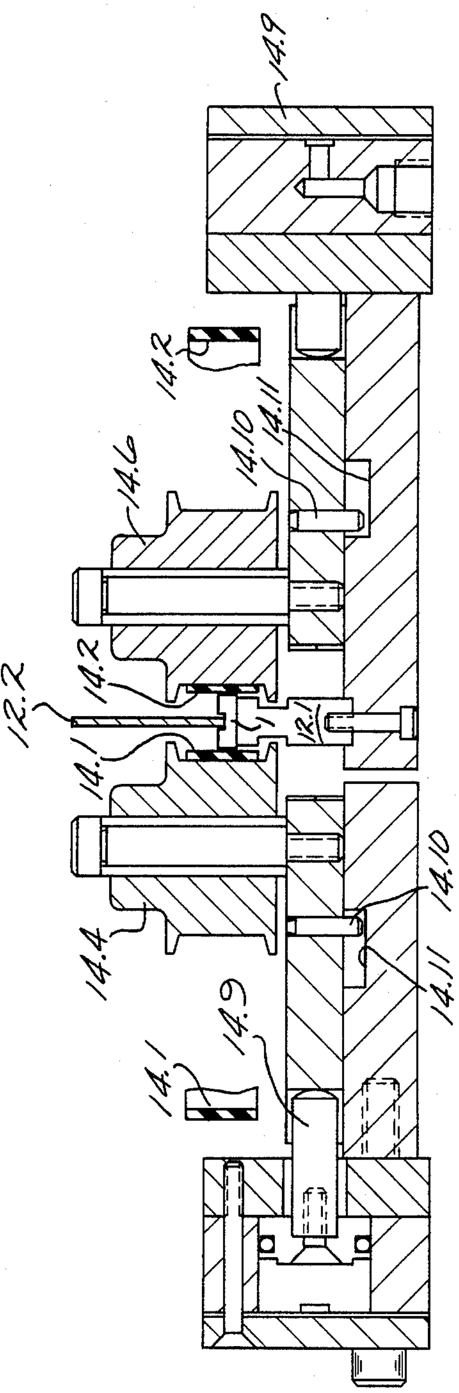
FIG. 8 is a cross sectional view of the feeding means showing details of idler air spring means.

With particular reference to FIGS. 4–8 the driving station will be described in greater detail. Belts 14.1 and 14.2 are trained between sheaves 14.4, 14.5 and 14.6, 14.7 respectively. The sheaves and belts are preferably timing sheaves and belts so that the driving sheaves 14.4, 14.6 can be geared together to drive belts 14.1 and 14.2 at indentical speeds. As best seen in FIG. 6, a main drive shaft 15 drives sheave 14.6 through gear 15.1 which drive in turn is transferred to sheave 14.4 through gears 15.2 and 15.3 respectively. Also seen in FIG. 6 is an end view of a socket 1 disposed on track portion 12.1 with a rib 12.2 received in a lengthwise extending groove 9 in the socket (see also FIG. 1 for an enlarged view of groove 9). Track portion 12.1 and rib 12.2 are disposed intermediate belts 14.1, 14.2 and are adapted to permit socket bodies to slide therebetween with belts 14.1, 14.2 adapted to be biased against sides 2.1, 3.1 of bodies 1 through loaded idler rolls 14.3. Idler rolls 14.3, although shown as having smooth circumferential surfaces, may if desired, be provided with grooves to receive the timing belt ribs. Idler rolls 14.3 are each mounted in a transversely extending track mechanism 14.8 and are adapted to be urged toward track portion 12.1 and rib 12.2 by pneumatic means between minimum and maximum limits determined by a peg 14.10 received in a stop surface groove 14.11 (FIG. 8). It will be understood that if preferred, a spring arrangement could be employed to load idler rolls 14.3 however pneumatic means are preferred since even distribution of the load among the several rolls is more easily achieved. As best seen in FIG. 5, which shows the drive station 14 in the reverse orientation to that of FIG. 3, that is, drive sheave 14.7 is shown at the right in FIG. 14, the spacing between a pair of sheaves can be adjusted via adjustment mechanism 14.12 which can move the mount of idler sheave 14.7 to the right or left as desired.

FIG. 7 shows a support bracket 12.3 for maintaining rib 12.2 in a selected spaced position relative to track portion 12.1 to permit bodies to slide therebetween.

Figure 9:
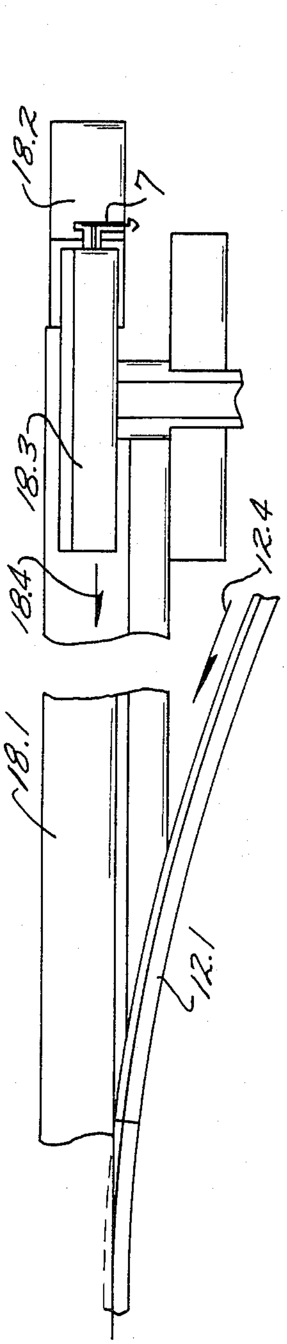
FIG. 9 is a front elevational view of the socket track comprising a portion of the first path and contact strip guide means comprising a portion of the second path.

With reference to FIG. 9 the carrier strip from which depend contact elements 7 is shown entering a guide rail means 18.2 after being trained around a small guide wheel 18.3 from reel 18 so that the strip is directed along path 18.1. A portion of body track 12.1 is curved relative to path 18.1 so that they converge with contact elements moving in the direction of arrow 18.4 and socket bodies moving up track 12.1 in the direction of arrow 12.4 until the bottom extreme portions of the contact elements are received in a receiving aperture 4 of body 1. Further movement results in the contact element moving further into its respective aperture.

Figure 10:
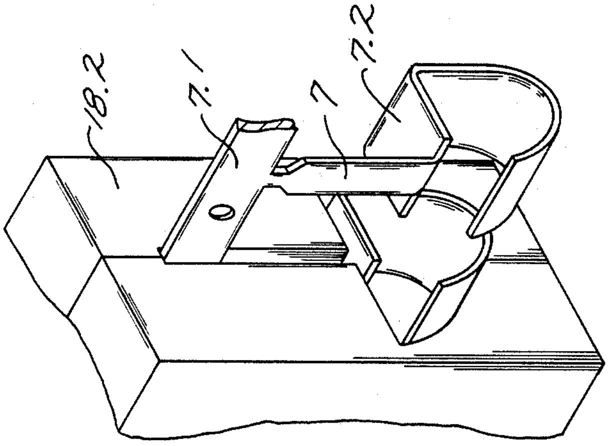
FIG. 10 is an enlarged, perspective view of a portion of the guide means of the contact strip.
Figure 11:
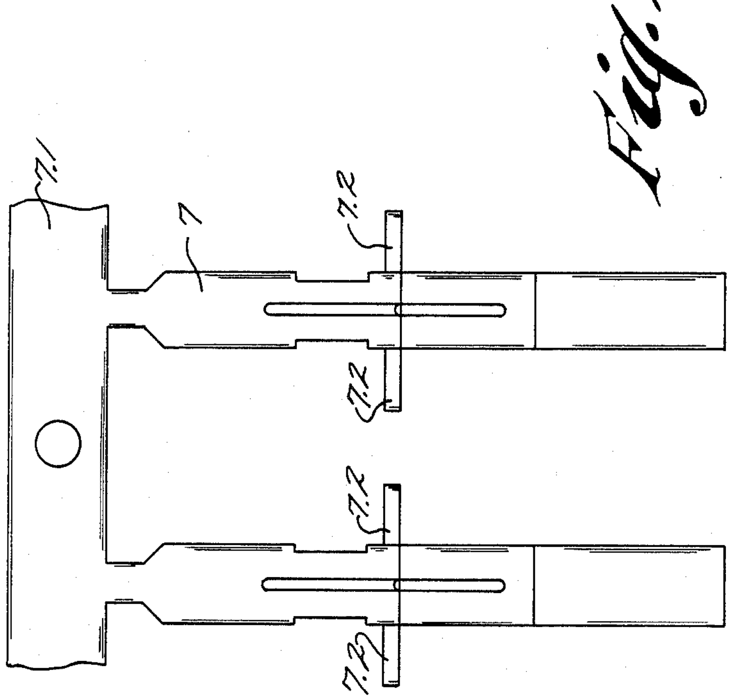
FIG. 11 is an enlarged front elevational view of a portion of the contact carrier strip with two contact elements depending therefrom.
Figure 12:
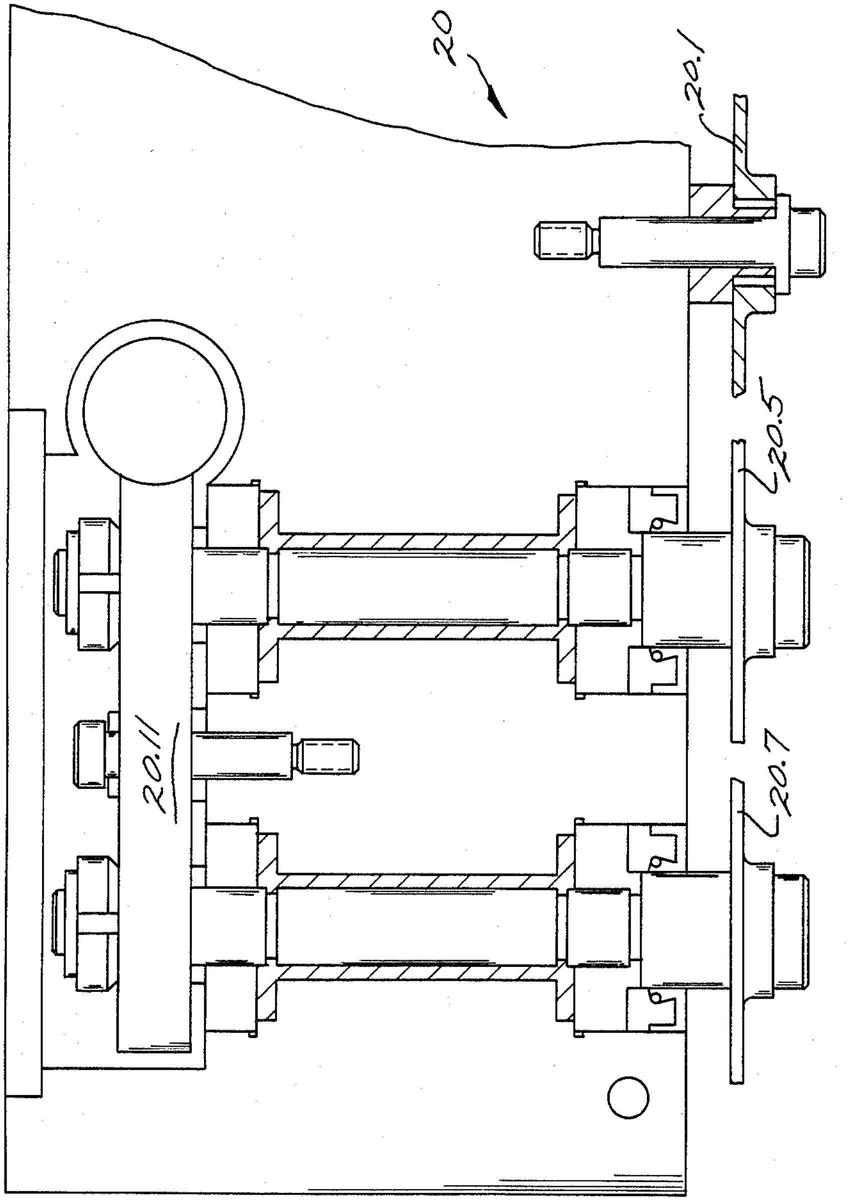
FIG. 12 is a top plan view of a seating and staking roll assembly.

The guide track for carrier strip 7.1 may totally enclose contact elements as seen in FIG. 10 or partially enclose them as indicated in FIG. 9 as desired.

Figure 14:
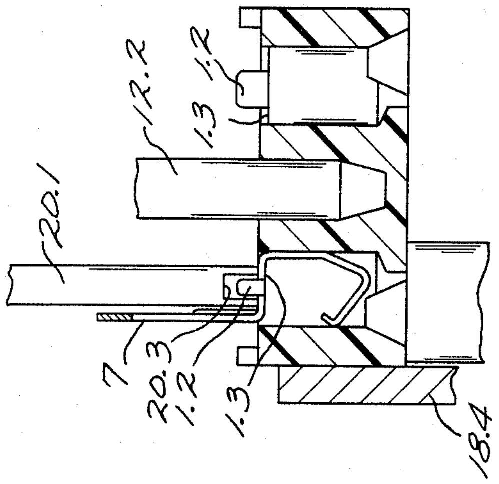
FIG. 14 is an enlarged cross sectional view of a portion of the seating roller engaging a contact element in the first row.
Figure 13:
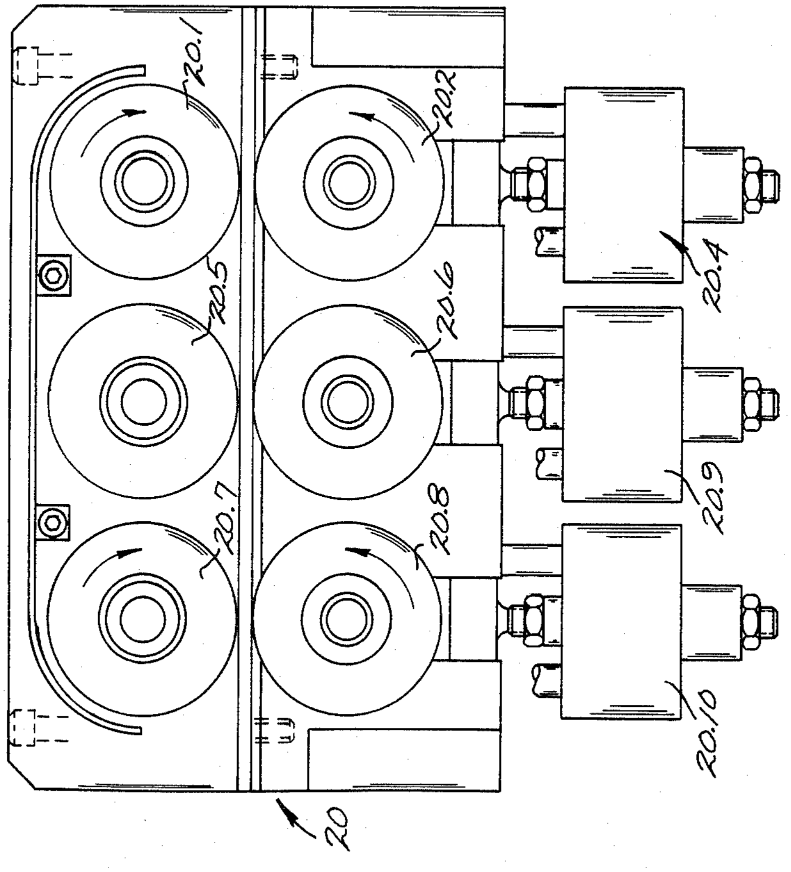
FIG. 13 is a front elevational view of the FIG. 12 assembly.
Figure 15:
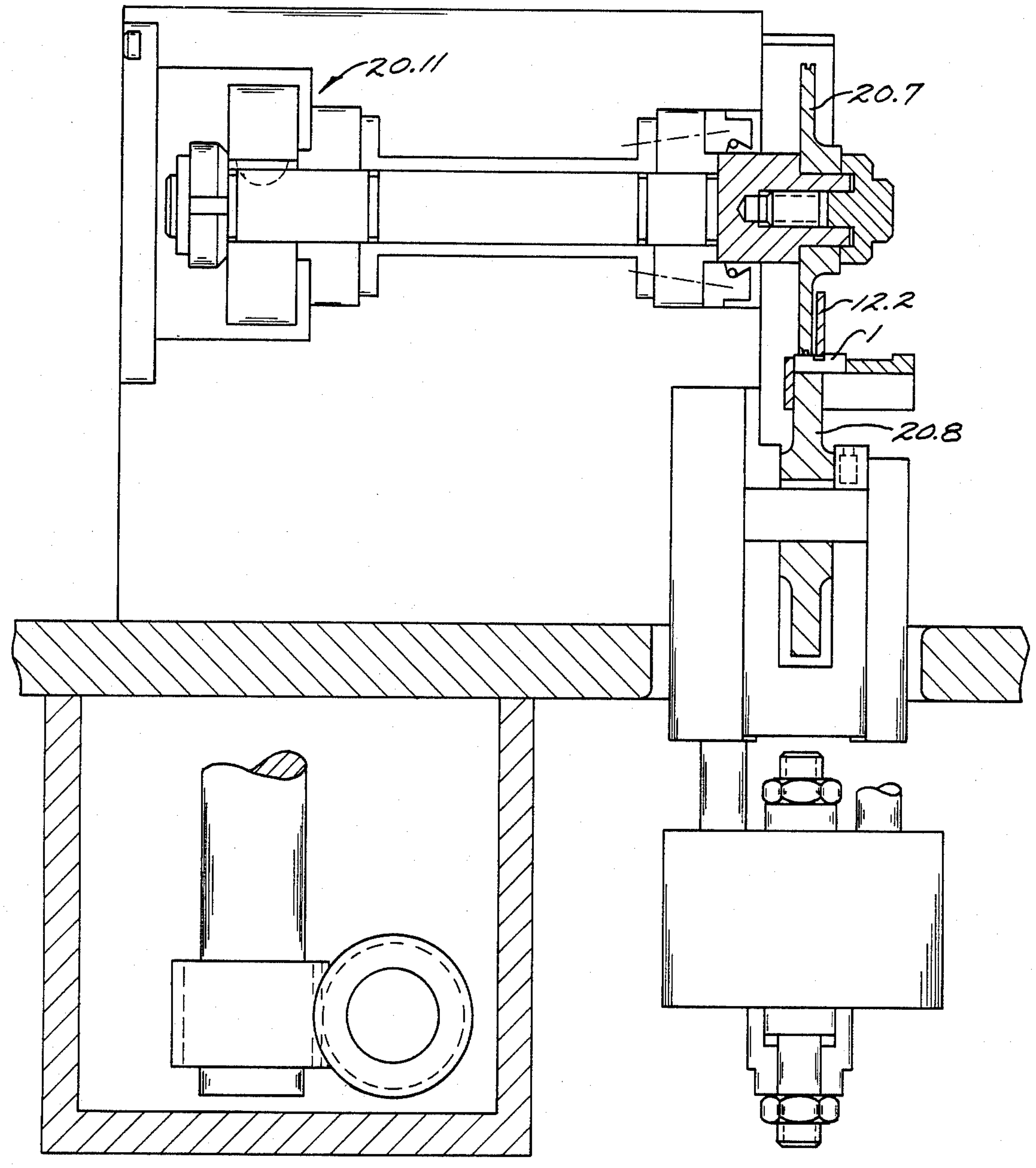
FIG. 15 is a cross sectional view showing an end view of a staking roller.

With particular reference to FIGS. 13 to 15, once the socket bodies have the contact elements received in their respective apertures, the bodies are received at the seating and staking station 20. The bodies first pass between a pair of seating rolls, upper roll 20.1 and lower roll 20.2, preferably non-driven with bottom roll 20.2 urged by conventional pneumatic means 20.4 toward the upper roll 20.1 with a selected force. As best seen in FIG. 14, socket body 1 is provided with tower portions or projections 1.2 extending above the top surface of the socket body. Projections 1.2 are provided between each of the apertures in a row as well as at the beginning and end of each row. The upper surface of the socket body has a transversely extending surface 1.3 which acts as a seat for transversely extending surface portions 7.2 of the contact element. The profile of the circumferential surface of upper roll 20.1 is configured in order to engage contact element portion 7.2 and ensure that it bottoms out on surface 1.3 of the socket body while a cut out portion 20.3 in the peripheral surface of the roll 20.1 avoids engagement with the projections 1.2 of socket 1.

Figure 16:
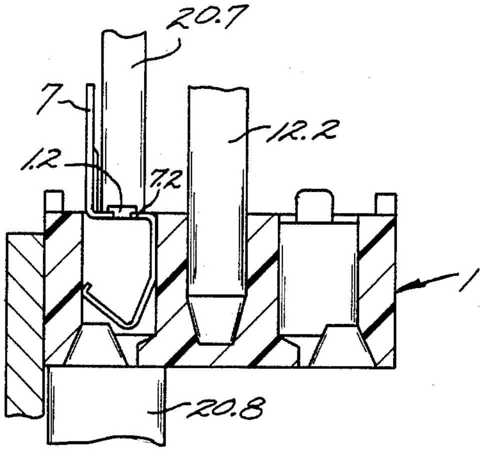
FIG. 16 is an enlarged cross sectional view of a portion of FIG. 15 showing the staking roll deforming a portion of the socket body onto a contact element.

After ensuring that the contact elements are fully seated, the bodies pass between two pairs of staking rolls. The particular number of pairs used is a matter of choice depending upon the degree of deformation desired at each pair of rollers. Further, as mentioned supra, deforming surfaces other than rolls could be employed if so desired. As shown in station 20, a first pair of rolls, upper roll 20.5 and lower roll 20.6 is follwed by a second pair of rolls, upper roll 20.7 and lower roll 20.8. The lower rolls are urged toward the upper rolls by suitable means such as pneumatic means 20.9 and 20.10 respectively. The profile of upper rolls 20.5 and 20.7 is such that the roll surface engages the projections 1.2 deforming them onto contact portion 7.2 to securely fasten the contact elements to the socket body. Thus the annular recess formed in roll 20.5 will be more than that formed in roll 20.7 so that roll 20.5 partially deforms the projection while roll 20.7 completes the deformation as best seen in FIG. 16. For optimum deformation of projections 1.2 it is preferred to drive rolls 20.5 and 20.7 by drive 20.11 so that the surface of the rolls contacting projections 1.2 move at approximately the same speed as the socket bodies so that the deforming force will essentially be in a downward direction.

Figure 17:
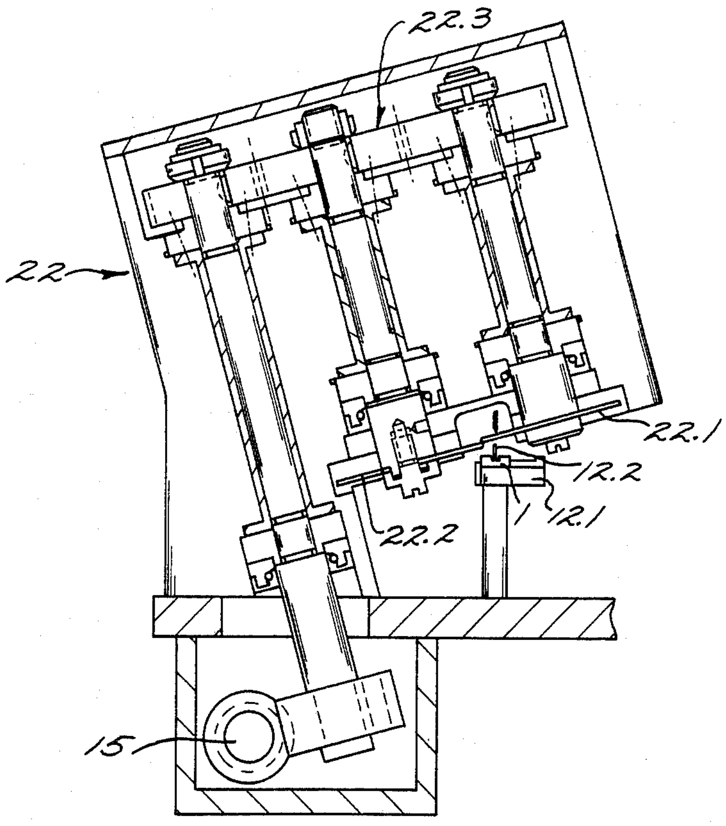
FIG. 17 is a cross sectional view showing an end view of the severing wheels for the first row of contacts.

Following the seating and staking station the socket bodies pass through severing station 22 seen in FIG. 17. Severing station 22 comprises first and second counter rotating severing wheels or discs 22.1, 22.2 adapted to sever contacts 7 from carrier strip 7.1 as the contacts are passed therebetween. The longitudinal axes of wheels 22.1 and 22.2 lie in a plane which is perpendicular to the path of the sockets and the axes are parallel to each other and inclined toward the plane in which the contact elements move so that positive clearance is provided between the cutting wheel and the contact element once the cut is completed. The wheels are driven through gearing 22.3 from main drive 15.

The bodies 1, after leaving station 22, are no longer connected to carrier strip 7.1 however they are still driven by drive unit 14 through upstream bodies. The bodies contact cam 24 (FIG. 3) and are referenced to the other side of track 12.2.

Another carrier strip having depending contacts 8 is directed from a suitable supply such as reel 26, along a third path 26.1, around a guide wheel 26.3 into a guide track 26.2, similar to guide track 18.2 but aligned with the opposite side of the track. Again, as shown in FIG. 9, socket body track 12.1 is curved over a portion of its length and is adapted to converge with the third path 26.1 with the contact elements adapted to be received in contact receiving apertures of row 3 (FIG. 1).

Following reception in the receiving apertures the contact elements pass through seating and staking station 28 where the complete seating of the contact elements is ensured by idler seating roll 28.1 cooperating with roll 28.2 urged against the bottom of the socket body (FIG. 18). Following this step the socket bodies pass through staking roll pairs, top roll 28.5, bottom roll 28.6 (not shown) and top roll 28.7, bottom roll 28.8. FIG. 19 shows staking roll 28.7 in contact with a body with opposed bottom roll 28.8 biased against the bottom surface of body 1 by suitable means such as pneumatic means 28.9. Top roll 28.7 is driven as in the case of rolls 20.5 and 20.7, through shaft 28.10, ultimately connected through suitable gearing to drive shaft 15.

Figure 21:
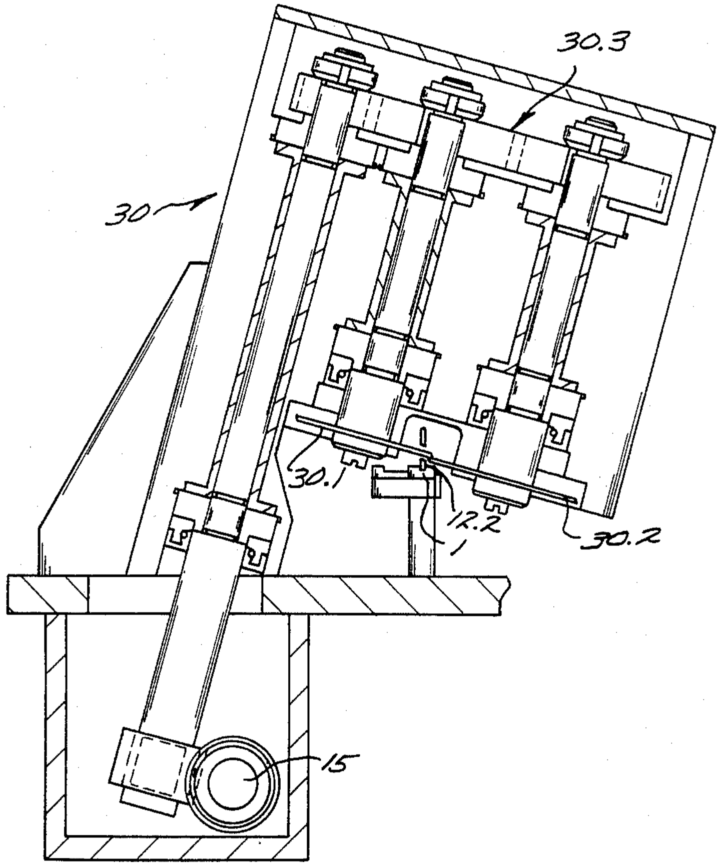
FIG. 21 is a view similar to FIG. 17 showing an end view of the severing wheels for the other row of contacts.

After the contact elements are staked to bodies 1 the bodies are passed through severing station 30 seen in FIG. 21. Severing station 30, similarly to severing station 22, comprises first and second counter rotating severing wheels or discs 30.1, 30.2 adapted to sever contacts 8 from carrier strip 8.1 as the contact elements are passed therebetween. The longitudinal axes of wheels 30.1 and 30.2 lie in a plane which is perpendicular to the path of the sockets and the axes are parallel to each other and inclined toward the plane in which the contact elements move but in the opposite sense from that of station 22 so that positive clearance is provided between the cutting wheel and the contact element once the cut is completed as well as clearing the upper extremities of contact elements 7 of the first row.

After being severed from carrier strip 8.1 the sockets are completely assembled and are pushed onto a suitable packaging or storage mechanism 32.

Figure 20:
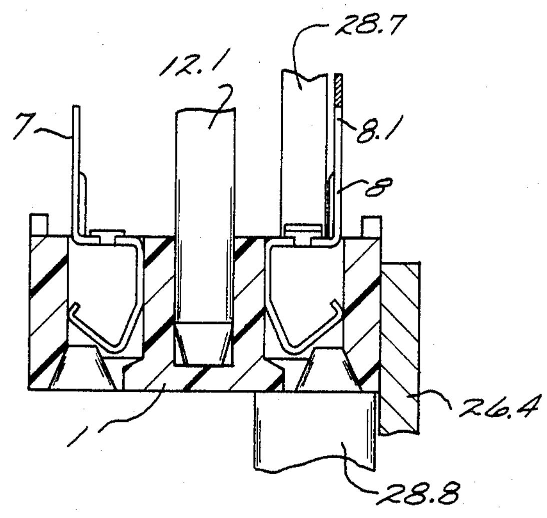
FIG. 20 is a view similar to FIG. 16 showing a contact element in the other row being staked by a staking roller.

By means of the above described method and apparatus, sockets can be assembled at a greatly increased rate compared to prior art systems. For example, apparatus made in accordance with the invention is capable of assembling sockets at a rate easily exceeding 1200 inches per minute which is equivalent to approximately 1500 sixteen position sockets as opposed to a rate of 300 sixteen pin sockets per minute or so for prior art equipment. No set time is required to prepare the apparatus for various length or width sockets. Rib 12.1 received in groove 9 of socket body 1 contacts surface 9.1 (FIG. 2) regardless of the width of groove 9 and references body against surface 18.4 (FIG. 14) for the first row of apertures and then after the sockets are cammed to the other side of the track for row 3 rib 12.1 contacts surface 9.2 and references body 1 against surface 26.4 (FIGS. 18, 20).

It will be noted that while track 12.1 has been shown to include a curved portion so that the first and second paths and the first and third paths merge tangentially, the paths of the socket bodies could be straight with the contact element paths curved, or all three paths could include a curved portion and still achieve the same result. The particular radius for the curved portion is chosen to provide apparatus which is not unduly long yet which provides sufficient clearance to provide convenient access to the component parts of the apparatus for servicing.

Operation of the apparatus is initiated by driving the socket bodies via drive station 14 until the bodies approach guide rail means 18.2 where the carrier strip is fed by hand until contact elements are received in receiving apertures after which driving force from drive station 14 is transferred to the carrier strips via the contact elements which pull the carrier strip from reel 18 as required. The sockets are then processed continously until the first bodies approach guide rail means 26.2 at which point the second carrier strip is fed by hand until contact elements are received in the apertures of the second cam so that body motion can be transferred to carrier strip 8.1 from reel 26 pulling the carrier strip as needed.

The pushing drive of the driving station assures that no gaps occur between consecutive socket bodies so that alignment of the apertures of a body with the contact elements depending from a carrier strip is inherent.

While the invention has been shown and described with reference to particular embodiments thereof, it will be understood by those skilled in the art that the foregoing and other changes in form and detail may be made without departing from the spirit and scope of the invention.

I claim:

1. A method for assembling a plurality of electrically conductive elongated elements in an electrically insulative body having element receiving apertures therein comprising the steps of forming a track along a first path, disposing spaced, movable surfaces on opposite sides of at least a portion of the path, feeding a plurality of bodies sequentially onto the track between the movable surfaces, biasing the movable surfaces against opposite sides of the bodies, moving the movable surfaces so as to impart movement of the bodies along the track, directing a continuous carrier strip having a plurality of elongated elements depending therefrom along a second path which meets tangentially with the first path, the elongated elements received in the element receiving apertures of the body as the first and second paths meet, biasing the elongated elements disposed in the element receiving apertures so that they are fully seated in the aperture, staking the body contiguous to each elongated element to secure said element to the body and severing the elongated elements from the carrier strip, motion being transferred to the carrier strip from the movable surfaces through the bodies and elongated elements assembled therein prior to severing of the elongated elements from the carrier strip.

2. Apparatus for assembling electrically conductive elements in an electrically insulative body having element receiving apertures therein comprising means for moving a plurality of bodies along a first path one behind another in abutting relation one with another, means operatively associated with said moving means for directing a movable, continuous carrier strip having a plurality of electrically conductive elements depending therefrom along a second path, one of the first and second paths including a curved segment adapted to meet the other of the first and second paths tangentially with the depending elements being received in the element receiving apertures of the body as the body is moved along the first path where the first and second paths meet whereby motion is imparted to the carrier strip through the depending elements which are pulled by the bodies as the depending elements are received in the element receiving apertures, and means operatively associated with said directing means for separating the elements from the carrier strip after they have been received in the element receiving apertures.

3. Apparatus according to claim 2 in which the means for moving the plurality of bodies includes spaced, movable walls disposed on opposite sides of at least a portion of the first path, the walls movable in the direction of the first path, the spacing between the walls being such that bodies are receivable therebetween with the walls biased against opposed walls of the bodies and further including means to move the walls at essentially identical speeds to move the bodies in a direction along the first path.

4. Apparatus according to claim 3 in which the spaced movable walls comprise a pair of endless belts, each a belt trained about two wheels, the wheels rotating about essentially vertical axes, and a plurality of idler wheels are disposed within each belt and and are adapted to be biased against their respective belt toward the path.

5. Apparatus for assembling electrically conductive, elongated elements in an electrically insulative body having elements receiving apertures therein comprising a support, a track mounted on the support extending in a direction and forming a first path, spaced movable walls mounted on the support disposed on opposite sides of at least a portion of the track, the walls movable in the direction of the first path, the movable walls being biased toward one another between a minimum and a maximum distance, feeding means for feeding a plurality of bodies onto the track between the spaced walls, the bodies having a width between the minimum and the maximum distance and having a plurality of element receiving apertures forming seats for the elongated elements, means mounted on the support for moving the movable walls to impart motion to the bodies through frictional engagement therewith, moving them on the track along the first path, the bodies in engagement with the movable walls pushing the bodies which are downstream of the movable walls with the bodies extending along the path in abutting end to end relationship, guide means mounted on the support for directing a freely movable, continuous carrier strip having a plurality of elongated elements depending therefrom along a second path, the second path meeting tangentially with the first path downstream of the feeding means, the elongated elements being received sequentially in a row of the element receiving apertures of a body as the body is moved along the first path where the first and second paths converge, staking means mounted on the support along the first path downstream of the meeting of the first and second paths to stake the elongated elements to the bodies after they are received in the element receiving apertures, and severing means mounted on the support along the first path downstream of staking means to sever the elongated elements from the carrier strip to separate the bodies from the carrier strip.

6. Apparatus according to claim 5 in which the movable walls comprise a pair of endless belts.

7. Apparatus according to claim 6 in which a plurality of idler rolls are placed within the area confined by each belt, the idler rolls being mounted to contact the inside surface of their respective belt and to move toward and away from the track between first and second limits, and means to urge the rolls toward the track to provide the bias on the movable walls toward one another.

8. Apparatus according to claim 7 in which the means to urge the rolls toward the track comprise air cylinders.

9. Apparatus according to claim 7 in which the means to urge the rolls toward the track comprise springs.

10. Apparatus according to claim 5 in which the track includes an elongated rib and the bodies are provided with a longitudinally extending rib receiving slot.

11. Apparatus according to claim 5 in which the spacing between sequential element receiving apertures in a longitudinal direction is equal in a given body and from body to body and is equal to the spacing between sequential elongated elements on the carrier strip whereby motion imparted to the bodies by the spaced movable walls is transferred to the freely movable carrier strip through the elongated elements after they have been received in element receiving apertures.

12. Apparatus according to claim 5 further including means to ensure that the elongated elements are fully seated in respective apertures of a body which comprise a pair of rolls having mounts movably biased relative to one another and disposed above and below the first path.

13. Apparatus according to claim 12 in which the rolls are idler rolls.

14. Apparatus according to claim 5 in which the staking means to stake the elongated elements to the bodies comprise a pair of rolls disposed above and below the first path, the bodies provided with a transversely extending surface adjacent the element receiving apertures and a projection extending above the transversely extending surface between adjacent apertures in each body, the elongated elements having an offset section which extends in a transverse direction, one of the rolls adapted to engage the projections as the body moves passed the rolls and deform the projections onto a portion of the transversely extending section of the elongated element to securely lock the element to the body.

15. Apparatus according to claim 5 in which the severing means comprise a pair of cutting wheels, the wheels lying in a plane which is inclined relative to the plane in which the elongated elements lie, the wheels having an axis which is perpendicular to the first path.

16. Apparatus according to claim 5 in which the bodies have a longitudinal axis and front and back ends, the bodies are provided with at least two longitudinally extending rows of elongated element receiving apertures, each aperture in a row spaced a distance d from its closest adjacent aperture in the row, the first and last apertures in a row respectively spaced ½ d from the front and back end of the body, the bodies have opposite side walls and a groove extending longitudinally from the first end to the back end and the track has a rib receivable in the groove, the support is provided with a reference side wall means disposed on a side of the first path, and camming means is mounted on the support along the first path, the reference side wall means and the camming means being positioned downstream of the movable walls and upstream of the meeting of the first and second paths to place the bodies on the track so that the rib is received in the groove with one side wall of each body in contact with said reference side wall means and the elongated elements are inserted into the row of apertures closest to the said one side wall.

17. Apparatus according to claim 16 further including an additional reference side wall means mounted on the support disposed on another side of the first path and additional camming means mounted on the support, the additional reference side wall means and additional camming means disposed downstream of the severing means, the additional camming means adapted to move the bodies laterally on the track so that another side wall of each body is in contact with the additional reference side wall means with the rib still maintained in the groove, additional guide means mounted on the support for directing a second, freely movable continuous carrier strip having a plurality of elongated elements depending therefrom along a third path, the third path meeting tangentially with the first path downstream of the additional camming means, the elongated elements being received sequentially in the element receiving apertures of the other row as the body is moved along the first path where the first and third paths converge, seating means mounted on the support along the first path downstream of the meeting of the first and third paths to ensure that the elongated elements are fully seated in respective apertures of the other row, additional staking means mounted on the support along the first path downstream of the seating means to stake the elongated elements to the bodies after they are seated in the apertures of the other row, and additional severing means mounted on the support along the first path downstream of the additional staking means to sever the elongated elements in the aperture of the other row from the second carrier strip.

18. Apparatus according to claim 14 in which the said one of the rolls is driven.

19. Apparatus according to claim 18 in which the said one of the rolls is driven at a speed such that the surface of the roll contacting the projections moves at approximately the same speed as the bodies.

20. Apparatus according to claim 5 in which at least one of the first and second paths includes a curved segment where the first and second paths meet.

21. Apparatus according to claim 17 in which the first path includes a curved segment where the first and second paths meet and the third path includes a curved segment when the first and third paths meet.

* * * * *